(12) United States Patent
Pfeffer

(10) Patent No.: US 9,066,153 B2
(45) Date of Patent: Jun. 23, 2015

(54) APPARATUS AND METHODS FOR MULTICAST DELIVERY OF CONTENT IN A CONTENT DELIVERY NETWORK

(71) Applicant: Time Warner Cable Enterprises LLC, New York, NY (US)

(72) Inventor: Howard Pfeffer, Reston, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 0 days.

(21) Appl. No.: 13/835,388

(22) Filed: Mar. 15, 2013

(65) Prior Publication Data

US 2014/0282784 A1    Sep. 18, 2014

(51) Int. Cl.
*H04N 7/173*      (2011.01)
*H04N 21/643*   (2011.01)
*H04N 21/858*   (2011.01)
*H04N 21/231*   (2011.01)
*H04N 21/25*     (2011.01)
*H04N 21/472*   (2011.01)

(52) U.S. Cl.
CPC ..... *H04N 21/64322* (2013.01); *H04N 21/8586* (2013.01); *H04N 21/23103* (2013.01); *H04N 21/252* (2013.01); *H04N 21/47202* (2013.01)

(58) Field of Classification Search
CPC ................................................ H04N 21/23103
USPC ........................................ 725/86, 94, 95, 112
See application file for complete search history.

(56) References Cited

U.S. PATENT DOCUMENTS

| | | | |
|---|---|---|---|
| 7,174,126 B2 | 2/2007 | McElhatten et al. | |
| 7,301,944 B1 | 11/2007 | Redmond | |
| 7,457,520 B2 | 11/2008 | Rossetti et al. | |
| 7,602,820 B2 | 10/2009 | Helms et al. | |
| 8,656,042 B2 | 2/2014 | Glasser et al. | |
| 8,681,680 B2 * | 3/2014 | Mao et al. | 370/312 |
| 2003/0056217 A1 | 3/2003 | Brooks | |
| 2005/0034171 A1 | 2/2005 | Benya | |
| 2006/0130113 A1 | 6/2006 | Carlucci et al. | |
| 2009/0193485 A1 | 7/2009 | Rieger et al. | |
| 2010/0246582 A1 | 9/2010 | Salinger et al. | |
| 2010/0251305 A1 | 9/2010 | Kimble et al. | |
| 2011/0093900 A1 | 4/2011 | Patel et al. | |

(Continued)

OTHER PUBLICATIONS

Internet Engineering Task Force (IETF) Standard ISSN: 2070-1721 entitled "The WebSocket Protocol", Dec. 2011.

(Continued)

*Primary Examiner* — Olugbenga Idowu
(74) *Attorney, Agent, or Firm* — Gazdzinski & Associates PC

(57) ABSTRACT

Methods and apparatus for providing persistent multicast delivery of content to devices within a network. In one embodiment, a webserver is provided to determine whether requested content is to be provided via a persistent multicast. If a multicast is not to be provided, the requesting device is instructed to query a unicast server. If a multicast is to be provided, the requesting device is instructed to query an entity for joining the multicast. After joining the multicast, the entity processes and provides the content to the requesting device as a unicast stream. In one variant, a web persistent port which is assigned by the entity to receive the multicast comprises a WebSocket compatible TCP port and the requesting device runs a WebSocket compatible media player. The webserver tracks requests to identify "popular" content to be delivered as a multicast. Content protection schemes and trick mode functions are also provided.

20 Claims, 12 Drawing Sheets

(56) References Cited

U.S. PATENT DOCUMENTS

| | | | |
|---|---|---|---|
| 2011/0103374 | A1 | 5/2011 | Lajoie et al. |
| 2011/0219229 | A1 | 9/2011 | Cholas et al. |
| 2012/0023535 | A1 | 1/2012 | Brooks et al. |
| 2013/0046849 | A1 | 2/2013 | Wolf et al. |
| 2013/0312046 | A1 | 11/2013 | Robertson et al. |

OTHER PUBLICATIONS

Sodagar, "the MPEG-DASH Standard for Multimedia Streaming over the Internet", IEEE Multimedia, IEEE Multimedia, Oct.-Dec. 2011 pp. 62-67.

Guidelines for Implementation: DASH264 Interoperability Points, DASH Industry Forum, Jan. 14, 2013.

"DOCSIS 3.0 Management Features Differences Technical Report" CM-TR-MGMT V3.0-DEGG-V01-071228.

"DOCSIS 3.0 OSSI Configuration Management Technical Report" CM-TR-OSSIv3.0-CM-V01-080926.

Motorola, White Paper *CCAP 101: Guide to Understanding the Converged Cable Access Platform*, Feb. 2012 (pp. 1-7).

CableLabs, "*Data-Over-Cable Service Interface Specifications (DOCSIS): Converged Cable Access Platform: Converged Cable Access Platform Architecture Technical Report*", CM-TR-CCAP-V03-12051, May 11, 2012 (pp. 1-44).

American National Standards Institute/Society of Cable Telecommunications Engineers specification ANSI/STCE-35 2007, entitled "*Digital Program Insertion Cueing Message for Cable*" (pp. 1-41).

*Digital Living Network Alliance (DLNA) Networked Device Interoperability Guidelines*: Microsoft Extension: [MS-DLNHND]—v20130722; Jul. 22, 2013 (pp. 1-61).

\* cited by examiner

APPARATUS AND METHODS FOR MULTICAST DELIVERY OF CONTENT IN A CONTENT DELIVERY NETWORK

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Disclosure

The disclosure relates generally to the field of content delivery. In one exemplary aspect, the disclosure relates to the use of a network architecture for providing packetized content as a multicast via a content distribution (e.g., cable, satellite) or other network.

2. Description of Related Technology

The provision of content to a plurality of subscribers in a network is well known. In a typical configuration, the content is distributed to the subscribers' devices over any number of different topologies including for example: (i) Hybrid Fiber Coaxial (HFC) network, which may include e.g., dense wave division multiplexed (DWDM) optical portions, coaxial cable portions, and other types of bearer media; (ii) satellite network (e.g., from an orbital entity to a user's STB via a satellite dish); (iii) optical fiber distribution networks such as e.g., "Fiber to the X" or FTTx (which may include for example FTTH, FTTC, FTTN, and FTTB variants thereof); (iv) Hybrid Fiber/copper or "HFCu" networks (e.g., a fiber-optic distribution network, with node or last-mile delivery being over installed POTS/PSTN phone wiring or CAT-5 cabling); (v) microwave/millimeter wave systems; etc.

Various types of content delivery services are utilized in providing content to subscribers. For example, certain content may be provided according to a broadcast schedule (aka "linear" content). Content may also be provided on-demand (such as via video on-demand or VOD, free video on-demand, near video on-demand, etc.). Content may also be provided to users from a recording device located at a user premises (such as via a DVR) or elsewhere (such as via a personal video recorder or network personal video recorder disposed at a network location) or via a "startover" paradigm, which also affords the user increased control over the playback of the content ("non-linear").

Just as different varieties of content delivery services have evolved over time, several different network architectures have also evolved for deploying these services. These architectures range from fully centralized (e.g., using one or more centralized servers to provide content to all consumers) to fully distributed (e.g., multiple copies of content distributed on servers very close to the customer premises, at the "edge" of the distribution network), as well as various other configurations. Some distribution architectures (e.g., HFC cable, HFCu, etc.) consist of optical fiber towards the "core" of the network, which is in data communication with a different medium (coaxial cable radio frequency, copper POTS/PSTN wiring, etc.) distribution networks towards the edge.

While the details of how video is transported in the network can be different for each architecture, many architectures will have a transition point where the video signals are modulated, upconverted to the appropriate channel (e.g., RF channel) and sent over the coaxial segment(s), copper wiring, (or air interface) of the network. For example, content (e.g., audio, video, etc.) is provided via a plurality of downstream ("in-band") RF QAM channels over a cable or satellite network. Depending on the topology of the individual plant, the modulation and upconversion may be performed at a node, hub or a headend. In many optical networks, nodes receive optical signals which are then converted to the electrical domain via an optical networking unit (ONU) for compatibility with the end-user's telephony, networking, and other "electrical" systems.

In U.S. cable systems for example, downstream RF channels used for transmission of television programs are 6 MHz wide, and occupy a 6 MHz spectral slot between 54 MHz and 860 MHz. Within a given cable plant, all homes that are electrically connected to the same cable feed running through a neighborhood will receive the same downstream signal. For the purpose of managing services, these homes are aggregated into logical groups typically called service groups. Homes belonging to the same service group receive their services on the same set of in-band RF channels.

Broadband data carriage in such networks is often accomplished using other (typically dedicated) QAM channels. For instance, the well known DOCSIS specifications provide for high-speed data transport over such RF channels in parallel with the video content transmission on other QAMs carried on the same RF medium (i.e., coaxial cable). A cable modem is used to interface with a network counterpart (CDN) so as to permit two-way broadband data service between the network and users within a given service group.

Out-of-band (OOB) channels (and associated protocols) may be used to deliver metadata files to a subscriber device, as well as to provide communication between the headend of the content-based network and the subscriber devices.

Other systems and methods may also be used for delivering media content to a plurality of subscribers. For example, so-called "Internet Protocol Television" or "IPTV" is a system through which services are delivered to subscribers using the architecture and networking methods of an Internet Protocol Suite over a packet-switched network infrastructure (such as e.g., the Internet and broadband Internet access networks), instead of being delivered through traditional radio frequency broadcast, satellite signal, or cable television (CATV) formats. These services may include, for example, Live TV, Video On-Demand (VOD), and Interactive TV (iTV). IPTV delivers services (including video, audio, text, graphics, data, and control signals) across an access agnostic, packet switched network that employs the Internet Protocol (IP). IPTV is managed in a way so as to provide the required level of quality of service (QoS), quality of experience (QoE), security, interactivity, and reliability via intelligent terminals such as PCs, STBs, handhelds, TV, and other terminals. IPTV service is usually delivered over a complex and heavy "walled garden" network, which is carefully engineered to ensure sufficient bandwidth for delivery of vast amounts of multicast video traffic.

IPTV uses standard networking protocols for the delivery of content. This is accomplished by using consumer devices having broadband Internet connections for video streaming. Home networks based on standards such as "next generation" home network technology can be used to deliver IPTV content to subscriber devices in a home.

So-called "Internet TV", on the other hand, generally refers to transport streams sent over IP networks (normally the Internet) from outside the network (e.g., cable, HFCu, satellite, etc.) that connects to the user's premises. An Internet TV provider has no control over the final delivery, and so broadcasts on a "best effort" basis, notably without QoS requirements.

There are also efforts to standardize the use of the 3GPP IP Multimedia System (IMS) as an architecture for supporting IPTV services in carrier's networks, in order to provide both voice and IPTV services over the same core infrastructure. IMS-based IPTV may be adapted to be compliant with the IPTV solutions specifications issued by many IPTV standards development organizations (SDOs), such as, e.g., Open IPTV Forum, ETSI-TISPAN, ITU-T, etc.

While delivery of packetized (e.g., IP) content is well known in the prior art, the ability to provide delivery of packetized media content to a subscriber device over a content delivery network (e.g., cable television HFC, HFCu, satellite, etc.), other than over the Internet as afforded by virtue of a satellite, cable, or other such modem (i.e., "Internet TV"), and/or by using expensive spectrum resources (e.g., via a CDN), has been lacking.

Still further, the foregoing systems typically utilize adaptive bitrate streams that are provided to requesting devices via unicast mechanisms (i.e., each user streams an individual copy of requested content). Therefore, delivery of the packetized media content in a content delivery network as discussed above would be greatly bandwidth-inefficient. Moreover, most network topologies and architectures (such as those discussed above) have a more efficient "multicast" capability which more efficiently uses available bandwidth; however, most IP enabled client devices do not support such multicast, and hence networks are relegated to use of the less efficient unicast or similar mechanism for delivery of IP streams.

Hence, it would be desirable to provide mechanisms to take advantage of commonalities or other bandwidth-conserving opportunities with such content distribution networks (e.g., overlaps in content requests where multiple users desire to stream the same content). Ideally, in one implementation, such mechanisms would allow for receipt of a multicast, and service of the received content as a unicast stream to individual requesting clients.

SUMMARY

The present disclosure addresses the foregoing needs by disclosing, inter alia, apparatus and methods for providing packetized content as a multicast via a content distribution (e.g., cable) network.

In a first aspect, a method for providing packetized content to a client device is disclosed. In one embodiment, the method comprises: (i) receiving a request for the packetized content from the client device, (ii) determining whether the requested packetized content is to be provided via a multicast to a group of devices, and (iii) when it is determined that the requested packetized content is to be provided via a multicast, providing the client device an instruction to query a gateway device. In one variant, the gateway device is configured to, in response to the query, join a multicast group for receiving the requested packetized content and provide the requested packetized content as a unicast stream to the client device.

In second aspect, a method for providing Internet Protocol (IP) packetized content to a client device is disclosed. In one embodiment, the method comprises: (i) receiving at a gateway apparatus a request for access to the IP packetized content from a client device, the request comprising a request for access to a document object associated to the IP packetized content, (ii) assigning a transmission control protocol (TCP) port for a persistent socket connection to provide the requested IP packetized content, (iii) providing to the client device, in response to the request, a URL for the persistent socket connection, (iv) receiving a request to enable the TCP port and access the requested IP packetized content from the client device, (v) in response to receiving the request, the gateway apparatus joining a multicast for providing the requested IP packetized content, (vi) processing the requested IP packetized content received via the multicast, and (v) providing the requested IP packetized content to the client device as a unicast thereto.

In a third aspect, an apparatus for providing Internet Protocol (IP) packetized content to a client device is disclosed. In one embodiment, the apparatus comprises: (i) at least one interface for receiving a multicast comprising the IP packetized content via a persistent socket connection, (ii) at least one interface for providing a unicast comprising the IP packetized content to the client device, and (iii) at least one processor configured to execute at least one computer program thereon. In one variant, the computer program comprises a plurality of instructions which are configured to, when executed: receive a request for access to the IP packetized content from the client device, the request comprising a uniform resource locator (URL) provided from a managed webserver, receive a request to enable a TCP port assigned to delivery of the requested IP packetized content via the persistent socket connection, and join a multicast for providing the requested IP packetized content.

In a fourth aspect, a system for delivery of content as a multicast in a content delivery network is disclosed. In one embodiment, the system comprises: (i) a plurality of client devices, at least one of the plurality of client devices configured to request access to the content from a managed webserver, (ii) the managed webserver configured to determine whether the requested content is to be provided as a multicast to the plurality of client devices, and cause the at least one of the plurality of client devices to request a gateway apparatus in communication with the at least one client device to join the multicast, and (iii) the gateway apparatus configured to receive the multicast comprising at least the requested content from at least one entity of a managed network and provide the requested content as a unicast to the at least one of the plurality of client devices.

In a fifth aspect, a computer program comprising a plurality of instructions which are configured to, when executed, provide Internet Protocol (IP) packetized content to a client device is disclosed.

In a sixth aspect, a managed webserver configured to determine whether requested packetized content may be delivered as a multicast is disclosed. In one embodiment, the managed webserver is further configured to instruct a client device requesting access to the packetized content to either request the content from an entity for providing a multicast thereof, or from an entity for providing a unicast thereof.

In a seventh aspect, a method of doing business is disclosed. In one embodiment, the method comprises providing packetized content to a plurality of devices as a multicast based on one or more rules.

These and other aspects of the disclosure shall become apparent when considered in light of the disclosure provided herein.

Figure 1:
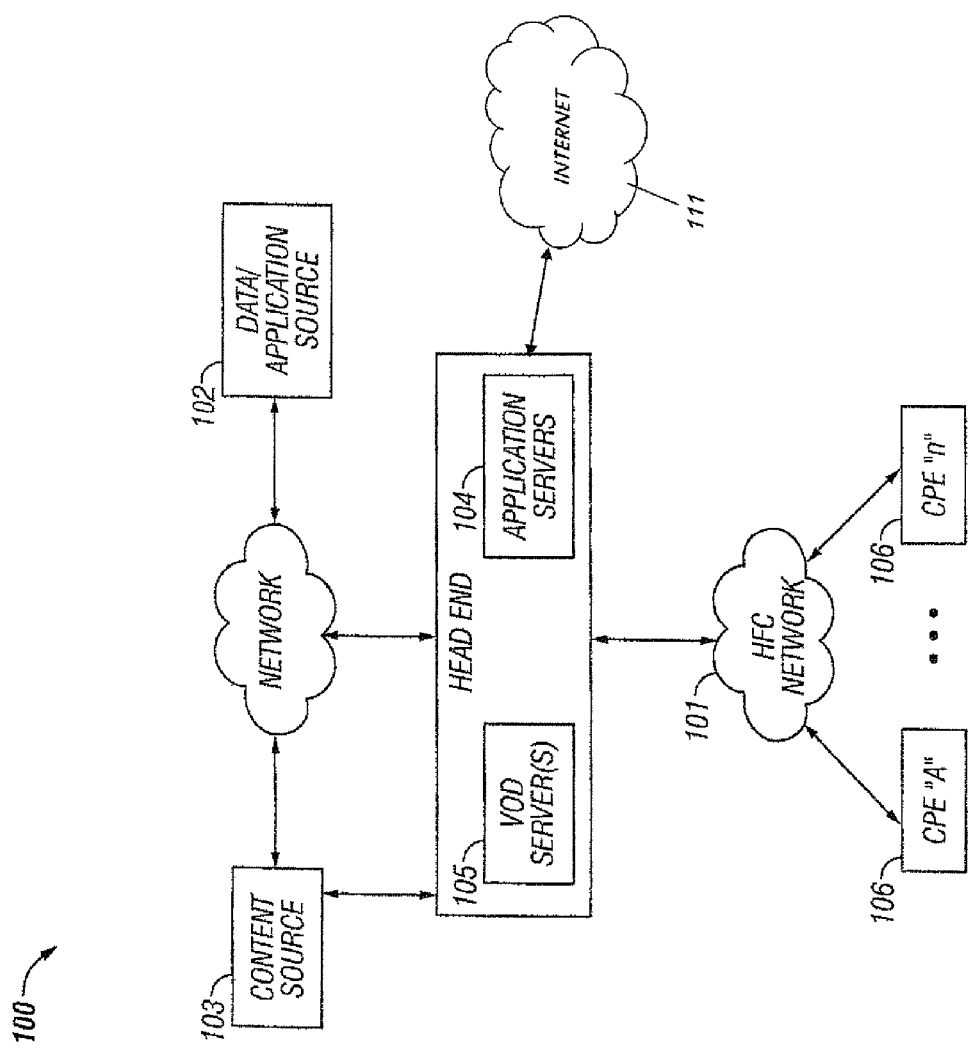
FIG. 1 is a functional block diagram illustrating an exemplary hybrid fiber network configuration useful with the present disclosure.

All Figures © Copyright 2013 Time Warner Cable, Inc. All rights reserved.

DETAILED DESCRIPTION

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", and smartphones.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421 M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The term "Customer Premises Equipment (CPE)" refers without limitation to any type of electronic equipment located within a customer's or user's premises and connected to or in communication with a network.

As used herein, the term "display" means any type of device adapted to display information, including without limitation CRTs, LCDs, TFTs, plasma displays, LEDs, incandescent and fluorescent devices, or combinations/integrations thereof. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0 and 3.0.

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet.

As used herein, the terms "Internet" and "interne" are used interchangeably to refer to inter-networks including, without limitation, the Internet.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components. As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), or IrDA families.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation, any of the variants of IEEE-Std. 802.11 or related standards including e.g., 802.11 a/b/g/i/n/v/z.

As used herein, the term "wireless" means any wireless signal, data, communication, or other interface including without limitation Wi-Fi, Bluetooth, 3G (3GPP/3GPP2), FIS-DPA/HSUPA, TDMA, CDMA (e.g., IS-95A, WCDMA, etc.), FHSS, DSSS, GSM, PAN/802.15, WiMAX (802.16), 802.20, Zigbee, narrowband/FDMA, OFDM, PCS/DCS, LTE/LTE-A, analog cellular, CDPD, satellite systems, millimeter wave or microwave systems, acoustic, and infrared (i.e., IrDA).

Overview

The present disclosure provides, inter alia, methods and apparatus for providing a multicast delivery of packetized content to client devices, such as those within a managed (e.g., MSO operated) network, using an extant network infrastructure. In one embodiment, a request is received from an IP-capable client device at a managed webserver. The request indicates particular packetized content which is desired for display at the client device. The managed webserver determines, based on the identity of the particular content, whether the content is to be provided via a multicast.

In the instance the content is not to be provided as a multicast, the managed webserver causes the client device to request the content from a unicast server (either directly or via a gateway or other proxy). In this instance, the managed webserver may further track or record the request in order to implement one or more operational or business rules for identifying "popular" content to be delivered, in the future, as a multicast.

In the instance the content is to be provided as a multicast, the managed web server causes the client device to request the content from e.g., a premises gateway apparatus in communication with a multicast server. The gateway is notified of the request for content, and assigns a web persistent port for delivery of the requested content. After joining the multicast, the gateway processes and provides the content to the requesting client device(s) as one or more unicast streams. In one variant, the port assigned by the gateway comprises a Web-Socket compatible TCP port. According to this variant, the client device is further configured to run a WebSocket compatible media player, such as e.g., a HyperText Markup Language (HTML) 5 video player.

Various operational/business rules are also provided for e.g., enabling and disabling trick mode functions with respect to playback of the requested content. In addition, content protection schemes are in one variant advantageously deployed at e.g., the gateway, the client device, and/or one or more network entities. Furthermore, various mechanisms for decreasing wait times between a content request and delivery thereof may be implemented.

Detailed Description of Exemplary Embodiments

Exemplary embodiments of the apparatus and methods are now described in detail. While these exemplary embodiments are described in the context of the aforementioned hybrid fiber coax (HFC) cable system architecture having an multiple systems operator (MSO), digital networking capability, IP delivery capability, and plurality of client devices/CPE, the general principles and advantages of the present disclosure may be extended to other types of networks and architectures, whether broadband, narrowband, wired or wireless, managed or unmanaged, or otherwise, the following therefore being merely exemplary in nature.

It will also be appreciated that while described generally in the context of a consumer (i.e., home) end user domain, the present disclosure may be readily adapted to other types of environments (e.g., commercial/enterprise, government/military, etc.) as well. Myriad other applications are possible.

Also, while certain aspects are described primarily in the context of the well-known Internet Protocol, it will be appreciated that the present disclosure may utilize other types of protocols (and in fact bearer networks to include other internets and intranets) to implement the described functionality.

Other features and advantages of the present disclosure will immediately be recognized by persons of ordinary skill in the art with reference to the attached drawings and detailed description of exemplary embodiments as given below.

Network—

FIG. 1 illustrates a typical content delivery network configuration with which the exemplary apparatus and methods of the present disclosure may be used. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101 (also referred to herein as a content delivery network (CDN)). The headend is also connected through a gateway or other such interface (not shown) to unmanaged external internetworks such as the Internet 111. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the disclosure. For example, the headend architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc, Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104. As will be discussed in greater detail below, in one embodiment the CPE may include IP-enabled CPE 107 (although not illustrated in FIGS. 1-1d), and a gateway or specially configured modem (e.g., DOCSIS cable modem).

Figure 1A:
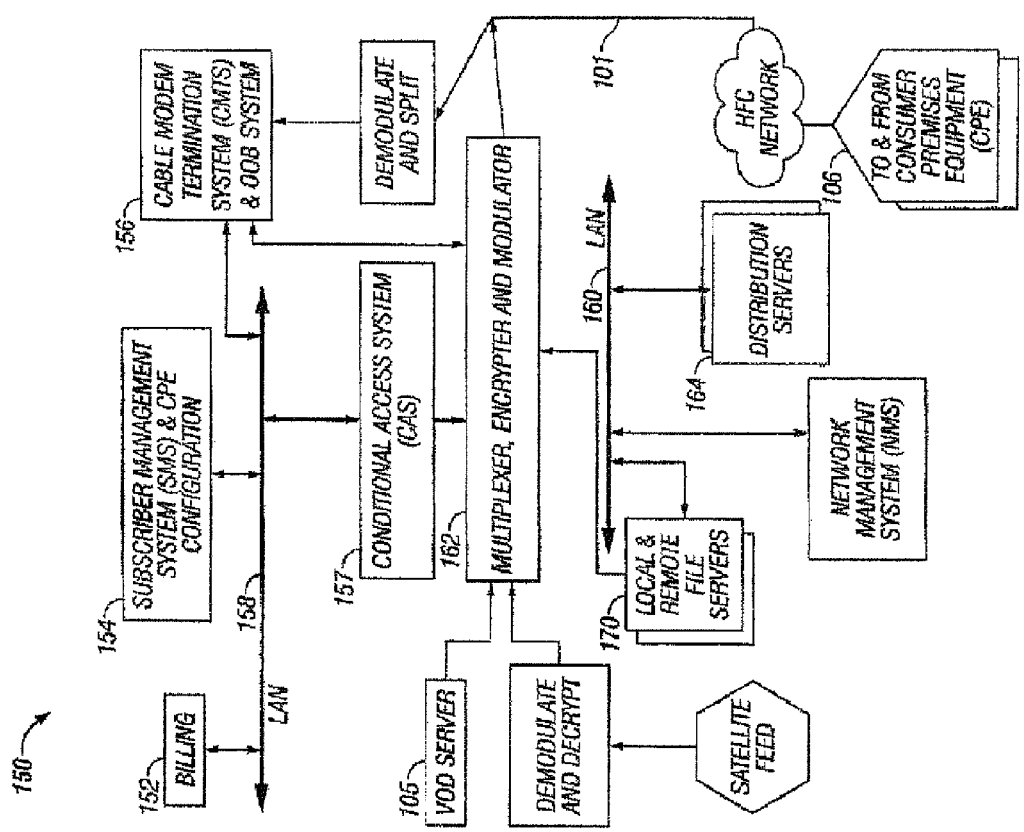
FIG. 1a is a functional block diagram illustrating one exemplary network headend configuration useful with the present disclosure.

Referring now to FIG. 1a, one exemplary embodiment of a headend architecture useful with the present disclosure is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the disclosure. It will also be appreciated that the headend configuration depicted in FIG. 1a is high-level, conceptual architecture and that each MSO may have multiple headends deployed using custom architectures.

Figure 1B:
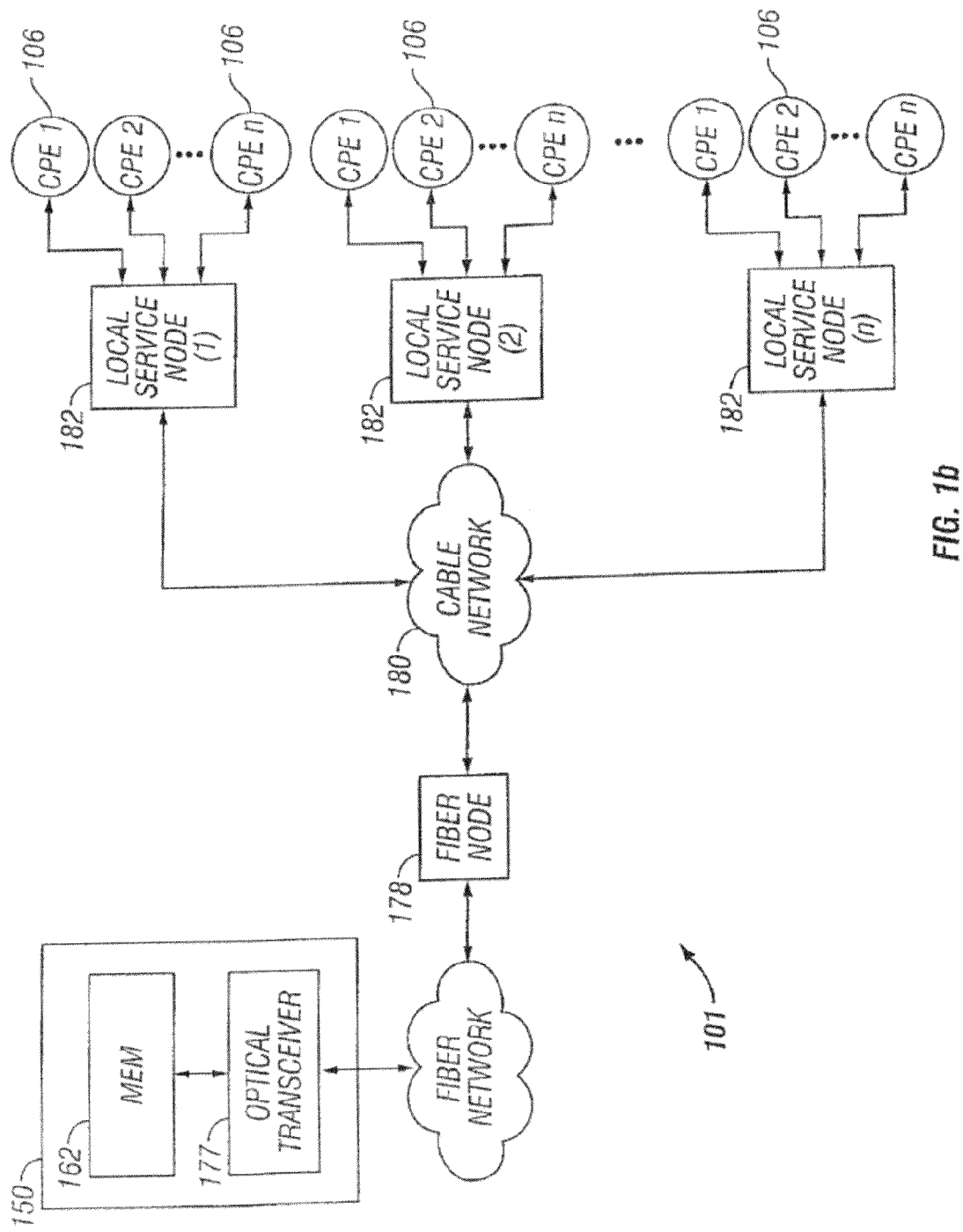
FIG. 1b is a functional block diagram illustrating one exemplary local service node configuration useful with the present disclosure.

The exemplary architecture 150 of FIG. 1a further includes a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend, as previously described and sent to neighborhood hubs (FIG. 1b) via a variety of interposed network components.

Figure 1C:
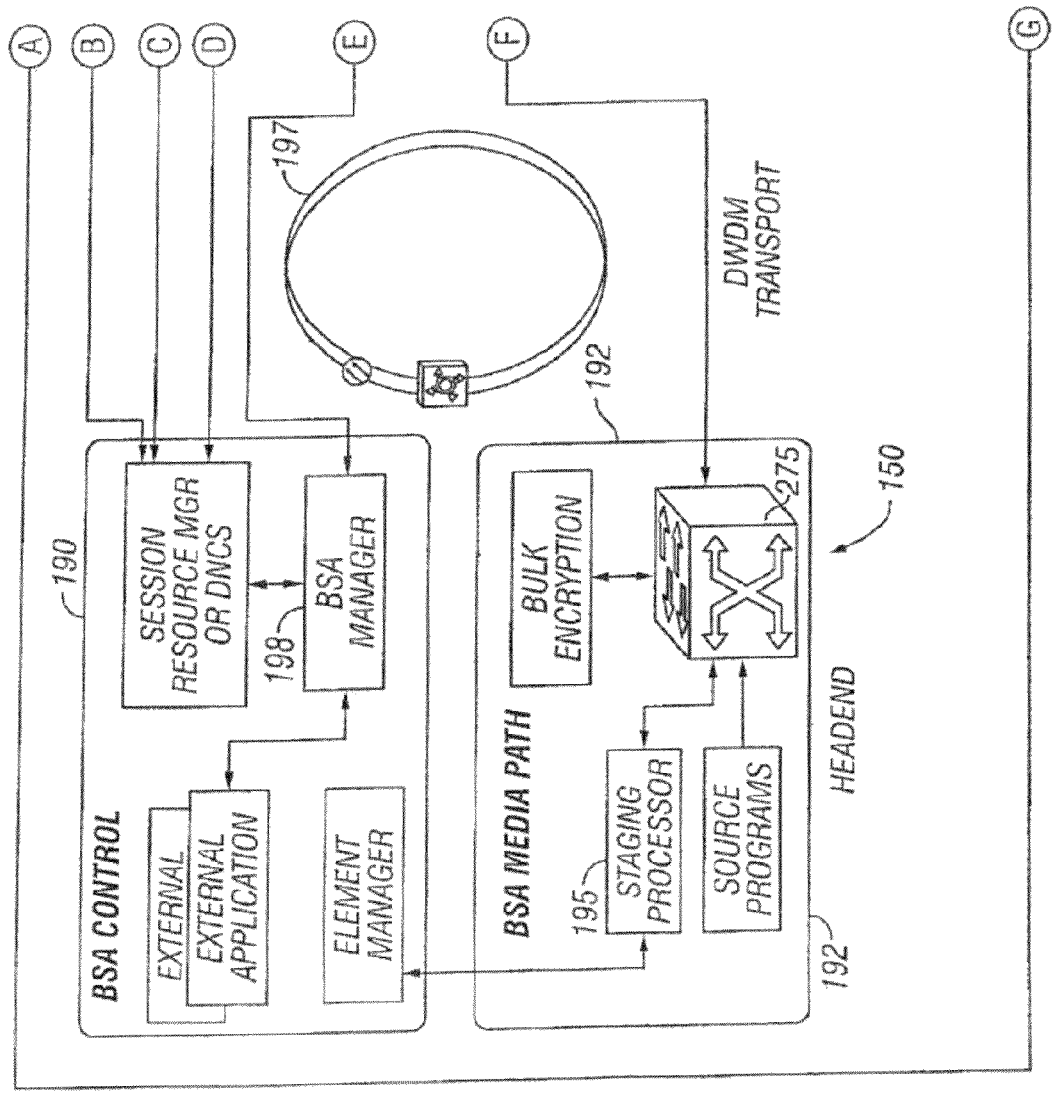
FIG. 1c is a functional block diagram illustrating one exemplary broadcast switched architecture (BSA) network useful with the present disclosure.
Figure 1C:
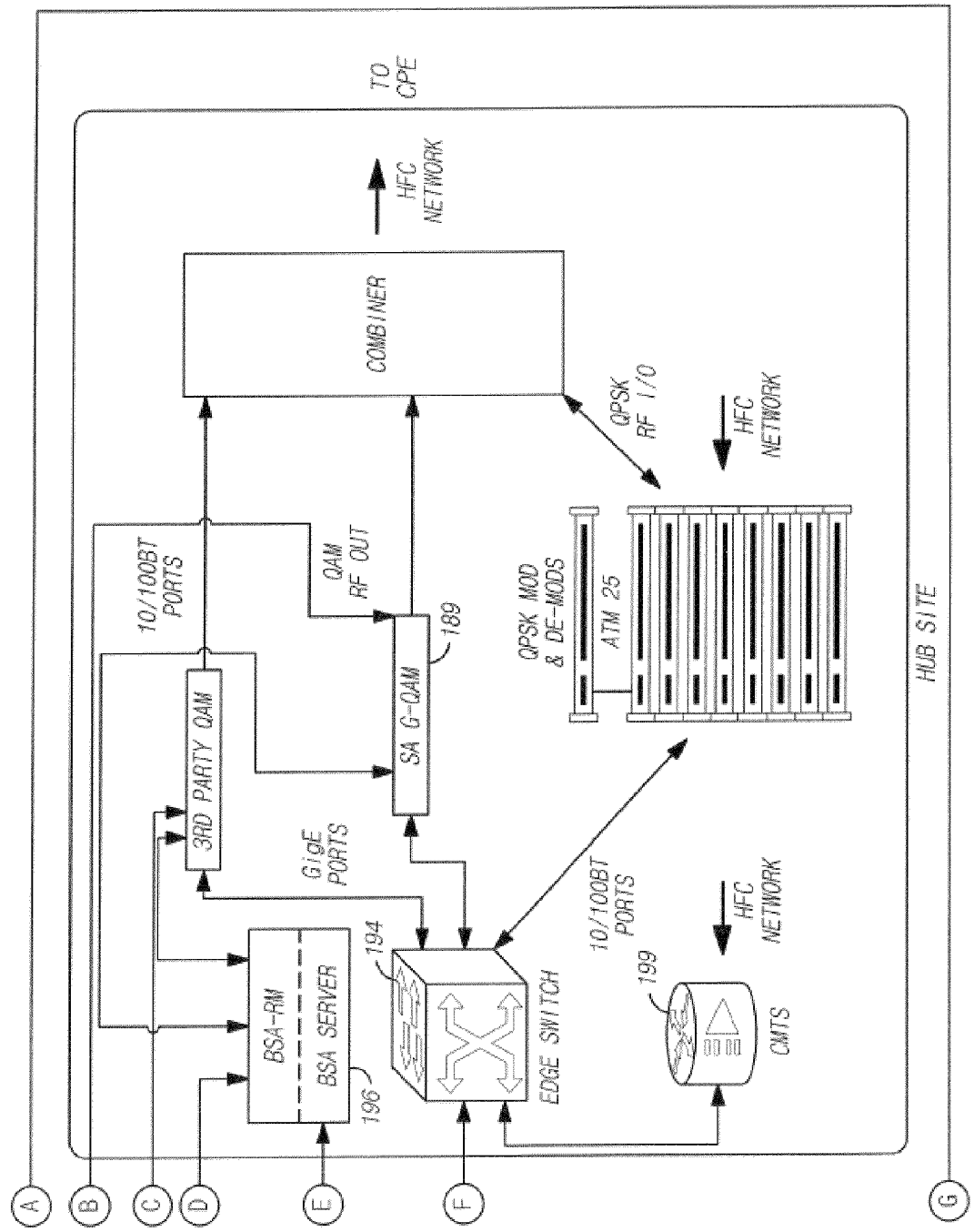

It will also be recognized, however, that the multiplexing operation(s) need not necessarily occur at the headend 150 (e.g., in the aforementioned MEM 162). For example, in one variant, at least a portion of the multiplexing is conducted at a BSA/SDV switching node or hub (see discussion of FIG. 1c provided subsequently herein). As yet another alternative, a multi-location or multi-stage approach can be used, such as that described in U.S. Pat. No. 7,602,820, entitled "APPARATUS AND METHODS FOR MULTI-STAGE MULTIPLEXING IN A NETWORK" incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed-back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0 (and subsequent) specification provides for exemplary networking protocols both downstream and upstream, although the disclosure is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

An optical transport ring (not shown) is also commonly utilized to distribute the dense wave-division multiplexed (DWDM) optical signals to each hub within the network in an efficient fashion.

"Switched" Networks—

FIG. 1c illustrates an exemplary "switched" network architecture. While a so-called "broadcast switched architecture" (BSA), also known as "switched digital video" or "SDV", network is illustrated in this exemplary embodiment for performing bandwidth optimization/conservation functions, it will be recognized that the present disclosure is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192; these elements cooperating to control and feed, respectively, downstream or edge switching devices 194 at the hub site which are used to selectively switch broadcast streams to various service groups. A BSA or SDV server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

As previously referenced, U.S. patent application Ser. No. 09/956,688 entitled "TECHNIQUE FOR EFFECTIVELY PROVIDING PROGRAM MATERIAL IN A CABLE TELEVISION SYSTEM" describes one exemplary broadcast switched digital architecture useful with the present disclosure, although it will be recognized by those of ordinary skill that other approaches and architectures may be substituted.

A primary advantage of the BSA paradigm is bandwidth conservation/preservation. Bandwidth for unviewed programs is not consumed, and can be re-allocated. Similarly, new programs can be added without adding bandwidth. Advantageously, programs with narrow appeal can be added in a BSA system with little if any bandwidth impact. More popular programs will impact the BSA bandwidth, but to a lesser extent than was traditionally the case. Multiple bitrates can also be made available for use or sale to programmers or advertisers.

In one exemplary embodiment, the methods and apparatus of co-owned, co-pending U.S. patent application Ser. No. 12/841,906 filed on Jul. 22, 2010 and entitled "APPARATUS AND METHODS FOR PACKETIZED CONTENT DELIVERY OVER A BANDWIDTH-EFFICIENT NETWORK", which is incorporated herein by reference in its entirety, may be utilized. As discussed therein, packetized content is provided to subscribers of an MSO network via extant bandwidth-optimized network infrastructure. In one embodiment, various legacy and IP-capable user devices receive a list of available content, from which a user may select. The user's selection is transmitted to an intermediary device or proxy (such as gateway apparatus in the home, or a headend server) which formats the request according to a standardized protocol utilized by a server (e.g., the BSA/SDV server of FIG. 1c) for providing bandwidth-optimized delivery of content. The server uses one or more bandwidth optimization techniques to provide the requested content to the proxy. If the content is requested by an IP-capable device, the proxy formats the content using protocol translation. The formatted content is then delivered to the requesting IP-capable CPE. However, if the content is requested from a legacy device (e.g., a non-IP enabled STB), protocol translation is not necessary. In this manner, IP and legacy CPE can be freely intermixed in any proportion in the service group and home, the gateway or headend proxy being configured to deliver content regardless of the requesting device.

In another exemplary embodiment, the edge switch 194 (generally located in the distribution hub as shown in FIG. 1c) is flooded with all available programs (so-called "dense" mode) Alternatively, the system may be configured to operate in a "sparse" mode, wherein IP streams are only delivered when the SDV server/resource manager requests them (such as via signaling the QAM modulator, which signals the router to perform a multicast membership request for a stream not presently carried). In this latter case, the physical switching function takes place in the router (as requested by the QAM modulator, responsive to the SDV server/resource manager request). The SDV server/resource manager is often located in the headend (versus the hub), since payloads do not pass through it, only control traffic.

Under the "flooding" (sometimes called "dense") paradigm, transport efficiency may be improved through use of simple unidirectional "drop and continue" protocol performed at each hub location on a given optical transport ring 197. The concept of flooding also simplifies the transport network in that no control system is needed; rather a simple "deliver everything" paradigm is used. This approach also advantageously makes this portion of the signal chain more robust, since more complex control systems generally lend themselves to a higher operational failure rate.

Because ordinary broadcast programming is supplied using BSA, the transport network 197 needs to have a high degree of availability. In the exemplary embodiment, BSA program transport is supplied through a redundant, spatially diverse counter-rotating Ethernet ring topology, although other topologies may be utilized with success.

Packetized Content Delivery Network—

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment, a "packet optimized" delivery network is used for carriage of the packet content (e.g., IPTV content). FIG. 1d illustrates one exemplary implementation of such a network, in the context of a 3GPP IMS (IP Multimedia Subsystem) network with common control plane and service delivery platform (SDP), as described in U.S. Patent Application Publication No. 2011/0103374 filed on Apr. 21, 2010, and entitled "METHODS AND APPARATUS FOR PACKETIZED CONTENT DELIVERY OVER A CONTENT DELIVERY NETWORK", incorporated herein by reference in its entirety. Such a network provides significant enhancements in terms of common control of different services, implementation and management of content delivery sessions according to unicast or multicast models, etc.; however, it is appreciated that the various features of the present disclosure are in no way limited to any of the foregoing architectures.

Multicast Packetized Content Delivery Network Architecture—

Figure 2:
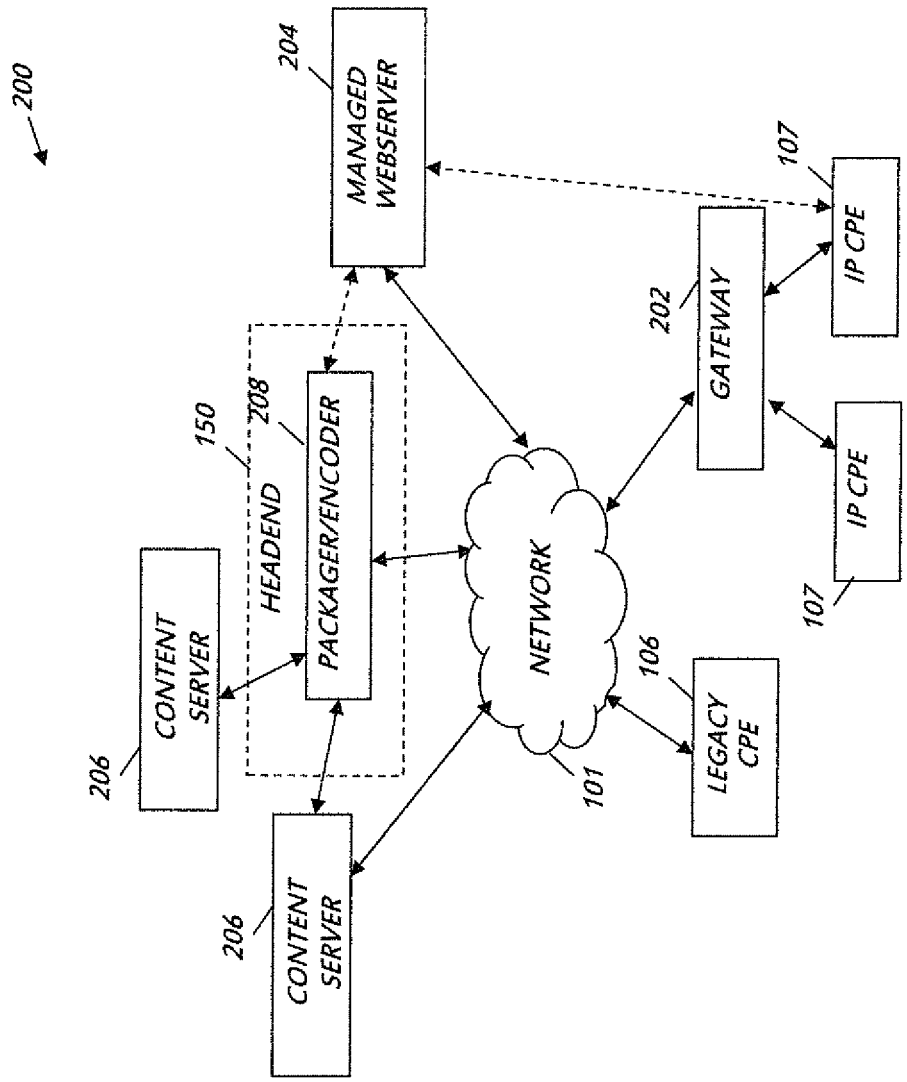
FIG. 2 is a functional block diagram illustrating a content delivery network architecture configured in accordance with one embodiment of the present disclosure.

Referring now to FIG. 2, a first exemplary embodiment of a network architecture 200 for the "persistent" delivery of packetized (such as IP packetized) content in a non-adaptive bitrate is illustrated. The persistent nature of the delivery refers to the utilization of a mechanism (i.e., client socket) which remains open and therefore provides continuous streaming of the content throughout the duration of playback. This is contrasted with prior art unicast delivery via HTTP Live streaming (HLS) wherein a series of HTTP GET/RESPONSE messages are required to fetch individual fragments/chunks of the video. Unicast delivery under these prior art mechanisms may pause and/or stutter during playback as each HTTP GET/RESPONSE utilizes a separate TCP/IP session.

As shown, the network 200 generally comprises a managed webserver 204 in communication with a plurality of IP capable CPE 107 via a gateway apparatus 202 over a network 101. As will be discussed in greater detail below, the exemplary implementation of the managed webserver 204 determines whether a multicast stream is available for content requested by an IP CPE 107, and if so, provides a mechanism whereby the gateway 202 is used to access the multicast content from one or more network entities (such as e.g., the packager/encoder 208) for delivery to the requesting IP CPE 107.

In addition, one or more legacy CPE 106 are illustrated as being in communication with the network 101 for receipt of content therefrom (via a legacy modem). As noted elsewhere herein, the network 101 may be configured to provide both packetized (such as IP packetized) content and non-IP packetized content to the devices in communication therewith, the latter being utilized by the legacy devices 106. It will be appreciated that the legacy CPE 106 may be further configured to incorporate IP connectivity with sufficient bitrate (e.g. MoCA or a wired or wireless Ethernet connection) and, via a software/firmware update, be re-purposed to view IP content, and even utilize DRM encryption given the proper media player and/or software decryption capability. The present disclosure contemplates that user premises may be configured according to one of the three foregoing forms (i.e., legacy only, mixed IP and legacy, and IP only), although other configurations are possible consistent with the disclosure.

As illustrated, the managed webserver 204 communicates with one or more entities of the network headend 150 in order to determine whether content is to be provided via a multicast. In one embodiment, the webserver 204 comprises or is in communication with a database (not shown) which is dynamically updated to contain information regarding the content available for multicast delivery. Still further, the webserver 204 may comprise a business rules engine for implementing one or more business rules for determining whether to cause content to be provided via multicast or unicast streaming.

A method for the delivery of IP packetized content using the exemplary architecture of FIG. 2 will be discussed in greater detail below.

The provided content may include web-based content, the entire carrier class stream (as discussed in previously incorporated U.S. patent application Ser. No. 12/841,906), and/or any content which would ordinarily be broadcast to the devices, encoded in MPEG-4 (or other IP encoding standard or codec). For example, broadcast content, VOD content, so called "quick clips" content (described in co-owned U.S. Pat. No. 7,174,126 issued Feb. 6, 2007 and entitled "TECHNIQUE FOR EFFECTIVELY ACCESSING PROGRAMMING LISTING INFORMATION IN AN ENTERTAINMENT DELIVERY SYSTEM" incorporated herein by reference in its entirety), so-called "start-over" and/or "lookback" content (described in co-owned, co-pending U.S. Patent Publication No. 2005/0034171 entitled "TECHNIQUE FOR DELIVERING PROGRAMMING CONTENT BASED ON A MODIFIED NETWORK PERSONAL VIDEO RECORDER SERVICE" incorporated herein by reference in its entirety), and/or so-called "remote DVR" content (as discussed in co-owned U.S. Pat. No. 7,457,520 issued Nov. 25, 2008 and entitled "TECHNIQUE FOR PROVIDING A VIRTUAL DIGITAL VIDEO RECORDER SERVICE THROUGH A COMMUNICATIONS NETWORK" incorporated herein by reference in its entirety) may be among the content which may be provided to the IP CPE 107 as a multicast stream according to the present disclosure. Other types of content may also be utilized consistent with the present disclosure.

In addition, the gateway 202 may also provide non-IP content to legacy devices (CPE 106). For example, in one embodiment, the gateway apparatus 202 may be of the type discussed in co-owned, co-pending U.S. Patent Application Publication No. 2011/0093900 filed on Oct. 20, 2009 and entitled "GATEWAY APPARATUS AND METHODS FOR DIGITAL CONTENT DELIVERY IN A NETWORK", which is incorporated herein by reference in its entirety. As discussed therein, interne (or IP packetized) content is de-encapsulated from a first media file container format and subsequently re-encapsulating to a second media file container format which is compatible with one or more receiving devices. For example, content which is delivered from a host server may be encapsulated in e.g., MP4, if the receiving client device(s) are not capable of reading the MP4 files, the gateway device 202 may re-encapsulate to e.g., MPEG-2 or other format that the receiving device is capable of reading. The gateway device 202 may process received content automatically into various alternative encapsulation formats or, may encapsulate as needed to the format of the specific requesting device. The processed content may also be stored at the gateway 202 or other data storage (whether at the premises or network) for future use for transmission to other client devices requesting the same content in the particular new format.

Figure 2A:
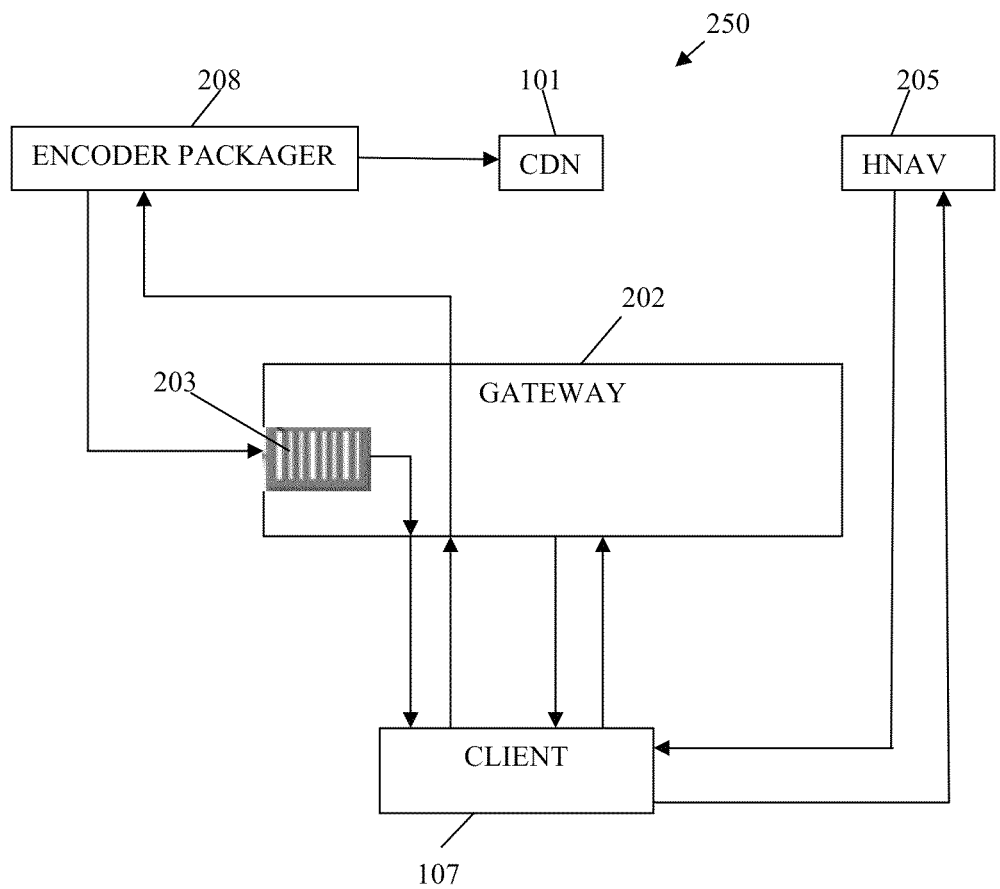
FIG. 2a is a functional block diagram illustrating a content delivery network architecture configured in accordance with a second embodiment of the present disclosure.

Referring now to FIG. 2a, another exemplary embodiment of an architecture 250 for the persistent multicast delivery of packetized (such as IP packetized) content is illustrated. As shown, the embodiment of FIG. 2a generally comprises a hosted navigation webserver (HNAV) 205 in communication with the IP-enabled CPE 107 via a gateway device 202.

In the illustrated embodiment, the gateway device 202 is configured to receive content from an encoder/packager 208. In one variant, the encoder/packager 208 may include one or more functions of the aforementioned headend multiplexer-encrypter-modulator (MEM) 162 (see discussion above with respect to FIG. 1a), thereby generating a multiplex comprising requested multicast IP content, and other content (whether IP or legacy). Alternatively, processing (as performed by the encoder/packager 208) may be accomplished by a separate entity than that entity which performs multiplexing operations. In other words, the encoder/packager 208 may comprise a separate entity than the MEM 162 if desired.

As is also illustrated in the architecture 250 of FIG. 2a, one exemplary embodiment the gateway apparatus 202 further comprises a buffer 203 to enable so-called "trick mode" operations. As will be discussed in greater detail below, the buffer creates a local cache of streamed content for enabling a user to e.g., stop or pause, slow, rewind, and fast-forward within, or perform other functions associated with, the streamed content.

The exemplary architectures discussed herein (e.g., FIGS. 2 and 2a) are used to provide requested content to an IP capable device 107 as an IP multicast via a managed network. In addition, the illustrated architectures 200 and 250 may advantageously allow for free intermixing of IP and non-IP content (e.g., MPEG-4 and MPEG-2 encoded streams). Specifically, as noted above, the encoder/packager 208 (or MEM 162) can create a multiplex comprising e.g., both IP packetized and non-packetized content (of any codec including, e.g., MPEG-4 and MPEG-2). In the instance broadcast switched mechanisms are used (as discussed in greater detail elsewhere herein), the SDV server 196 can switch in or out both types of content for delivery across the network. The entity providing the content (e.g., SDV server 196, MEM 162, and/or encoder/packager 208) is, in one implementation, never made aware of the payload type (e.g., MPEG-2 or MPEG-4) for requested content, thereby providing delivery of IP content to match user requests without requiring any knowledge of what type of content it is carrying ("agnostic" delivery).

Moreover, there is no predetermined ratio of packetized to non-packetized content in the present system; the multiplex can literally range from having all one type of content, to all of the other, to any mix or proportion therebetween.

Methodology—

Figure 3:
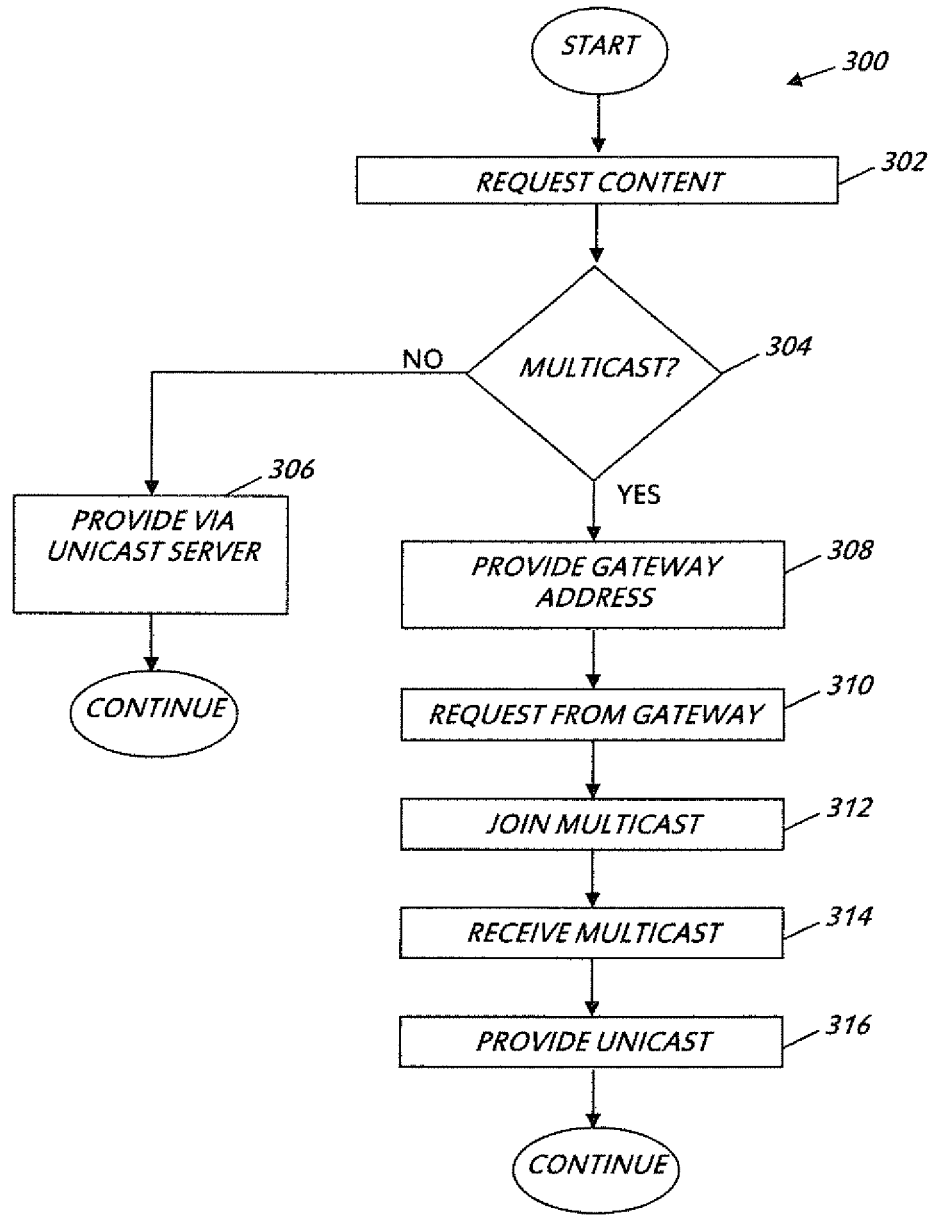
FIG. 3 is a logical flow diagram illustrating an exemplary embodiment of a generalized method for providing IP packetized content delivery via a multicast according to the present disclosure.

Referring now to FIG. 3, an exemplary embodiment of a generalized method 300 for providing IP packetized content delivery as a multicast according to the disclosure is illustrated. As shown, per step 302, an IP capable client device 107 requests particular content. In one embodiment, the request is transmitted from the device 107 to the webserver 204 (or HNAV 205). The gateway apparatus 202 may facilitate communication between the client 107 and the webserver 204. For instance, the IP CPE 107 may transmit this request using e.g., Digital Living Network Alliance (DLNA) protocol to the gateway device 202. Alternatively, the IP CPE 107 may transmit the request directly to the managed webserver 204.

In response to receiving the request, the webserver 204 (or HNAV 205) determines whether the requested content is available to be multicast to the requesting device (step 304). Exemplary operational or business rules for identifying content for multicast delivery will be discussed subsequently herein.

Per step 306, when it is determined that the content is not available for multicast delivery, the content is provided to the client device via unicast delivery thereto. In one embodiment, this is accomplished by returning a message to the client device 107 indicating that the content should be requested directly from the appropriate content server 206. Accordingly, the client device 107 (or gateway 202 without the knowledge of the client 107) transmits the request message directly to the unicast server 206 for providing the requested content. In turn, the unicast server 206 provides the content as a unicast to the requesting client 107, either directly or via the gateway 202. In the event the gateway 202 acts as a proxy for communication with network 101 entities and/or the content servers 206, such functionality may be made invisible to some or all of the entities involved in the communications. For example, the network 101 entities may be unaware that communication is being routed through a gateway apparatus 202 to the requesting device 107.

When it is determined that the content is available for multicast delivery, per step 308, the managed webserver 204 provides a message to the client 107 that the content should be requested from the gateway 202. In other words, a response message is provided identifying an address or uniform resource locator (URL) of the gateway 202. The client device 107 uses the URL to request access to the content from the gateway 202 (step 310). An identifier of the content is placed within a request message from the client device 107 to the gateway 202.

The gateway apparatus 202 in communication with the client device 107 performs the steps necessary to join the multicast and receive the multicast content (steps 312 and 314). Next, at step 316, the gateway 202 processes the content, for example to convert the multicast content to unicast, and provides the content as a unicast stream to the requesting device 107.

Once the requested content has completed playback and/or when the user requests to change the channel or otherwise navigate away from the requested content, the gateway 202 may "tear down" delivery of the previous stream and affirmatively unjoin the multicast group. In one embodiment, this is accomplished by e.g., sending an Internet Group Management Protocol (IGMP) leave group message from the gateway, thereby causing the routers to stop forwarding the multicast packets to the gateway.

Figure 4:
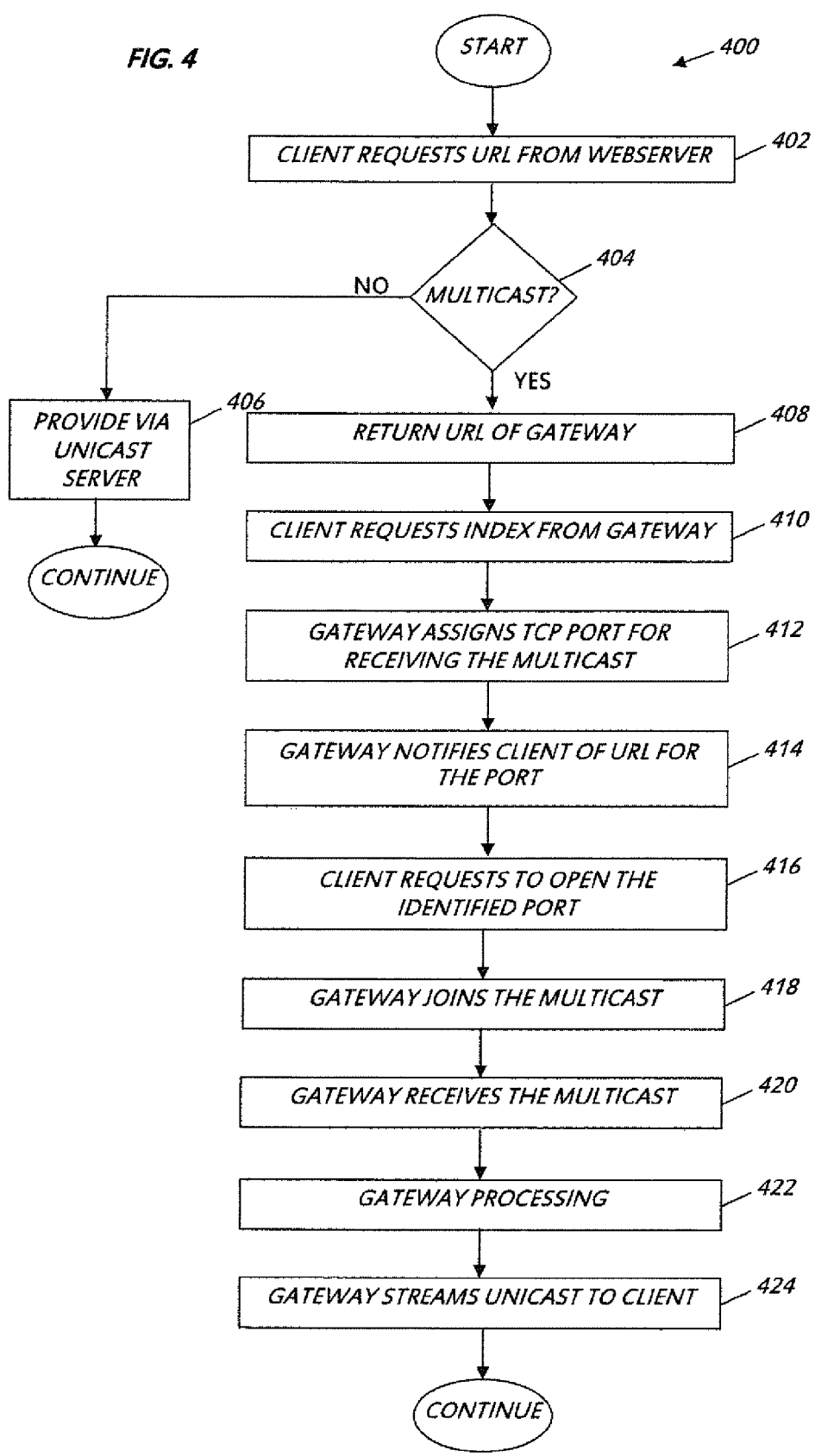
FIG. 4 is a logical flow diagram illustrating an exemplary implementation of the method of FIG. 3.

FIG. 4 is a logical flow diagram illustrating an exemplary implementation of the method of FIG. 3. At step 402 of the method 400, the client device 107 requests content by providing a URL for the content server 206 which provides the requested content to the webserver 204. The webserver 204 consults a data structure (e.g., dynamically updated table) comprising information relating to each of the URL associated to content that is provided via a multicast. The webserver 204 utilizes the provided URL to determine whether the content server 206 which provides the requested content is among those URL identifying content servers providing content that is to be multicast (step 404). In another embodiment, other information may be utilized to identify whether the requested content is available for multicast delivery, such as e.g., a content identifier, the foregoing being merely representative of a particular embodiment. It is further appreciated that a database or list of content available as a multicast may be provided to another network entity, the gateway 202, and/or client device 107 (and updated as necessary). According to this variant, a decision as to whether to request content from the unicast servers 206 individually or join a multicast may be made by e.g., the gateway 202, client 107, or other network entity.

If the provided URL does not match any of the URLs in the webserver 204 database (or it is otherwise determined that the requested content is not available as a multicast), the client is informed that the content must be requested directly from the content server 206. Alternatively, the webserver 204 may forward the request to the appropriate server. In yet another embodiment, the gateway 202 may act as a proxy for communication to the unicast server 206. The content is then provided from the content server 206 to the requesting IP capable device 107 either directly or via the gateway 202 proxy as a unicast stream (step 406).

If the provided URL matches to a URL in the webserver 204 database (or it is otherwise determined that the requested content is available as a multicast), the webserver 204 returns a message to the CPE 107, which includes a URL of the gateway apparatus 202 (step 408). The CPE 107 uses the URL to request an index from the gateway 202 (step 410). In one embodiment, the client issues a hypertext transfer protocol (HTTP) GET message to the gateway 202 for the index (i.e., request access to the document object model (DOM)).

In response to the request, the gateway 202 assigns a transmission control protocol (TCP) port for receiving the multicast. In one embodiment, the content is received via the WebSocket web technology, as discussed in Internet Engineering Task Force (IETF) Standard ISSN: 2070-1721 entitled "The WebSocket Protocol" dated December 2011, and incorporated herein by reference in its entirety. The WebSocket protocol enables, inter alia, two-way communication between a client running entrusted code in a controlled environment (such as e.g., the IP-enabled client device 107 and/or the gateway apparatus 202) to a remote host that has opted-in to communications from that code. The security model used for this process is the origin-based security model commonly used by web browsers, although it will be appreciated that other approaches may be used consistent with the present disclosure. The protocol consists of an opening handshake followed by basic message framing, layered over TCP. WebSocket provides a mechanism for browser-based applications that need two-way communication with servers that does not rely on opening multiple HTTP connections (e.g., using XMLHttpRequest or I-frames and long polling).

The aforementioned handshake occurs at steps 414-416 of the method 400, whereby the client device 107 is notified of the assigned port (via e.g., a message from the gateway indicating an index pointing to the WebSocket URL) and requests to requests to open the identified port. In one embodiment, the request to open the identified port again comprises an HTTP GET request for the WebSocket URL. The WebSocket handshake indicates to the server to change from REQUEST/RESPONSE mode to a persistent mode; the transmission control protocol (TCP) connection remains ready.

Next, per step 418, the gateway apparatus 202 joins the multicast group in order to receive the requested content as a multicast stream (step 420) from e.g., the encoder packager 208, the MEM 162, SDV server 196, or other headend entity. In one embodiment, the content is received as an MPEG-2 transport stream. In other words, the MPEG-4 or other packetized content is encapsulated in MPEG-2. To accomplish such encapsulation, a headend entity (or in one embodiment the gateway 202) is configured in one implementation to de-encapsulating the received internet content from a first media file container format and subsequently re-encapsulating the internet content to a second media file container format. One exemplary delivery paradigm comprises delivering MPEG-based video content (e.g., "IPTV" or the like), with the video transported to IP capable CPE 107 over the e.g., a DOCSIS channel (or other in-band channel) as MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels (such as e.g., MPEG 2 transport stream).

At step 422, the gateway apparatus 202 then processes the received content. The processing performed by the gateway 202 may include transcription, translation, and/or transcoding to generate a content stream which is in a suitable format for playback at the client device 107. In one exemplary embodiment, content is converted from multicast to unicast by the gateway apparatus 202. This may be accomplished via well known network address translation (NAT). In other words, the gateway apparatus 202 receives the multicast and modifies IP address information in IP packet headers to reference a unicast delivery address. However, it is appreciated that other translation or processing methods may be used with equal success. For example, a simple protocol conversion may be utilized whereby the payload is taken out of the multicast packet and transmitted over the WebSocket protocol. It is further appreciated that the gateway 202 may optionally perform other processing of the received content, such as transcryption to provide content in an encryption scheme used by the requesting client 107, transcoding to provide content in a codec used by the requesting client 107, and/or transrating.

In addition, processing via the gateway 202 may further include modification of the HTTP Live Streaming (HLS) protocol to support persistent stream of non-adaptive video. Hence, the gateway 202 is able to provide a persistent stream in addition to current GET/Response of individual chunks. The use of the HLS protocol modification to provide a persistent stream of non-adaptive video is further advantageous, in that the multicast from the network does not guarantee delivery or packet order; delivering the multicast in native MPEG2-transport stream addresses this problem. However, in another embodiment, the content may be provided using Dynamic Adaptive Streaming over HTTP (DASH) as disclosed in Sodagar, "*The MPEG-DASH Standard for Multimedia Streaming Over the Internet*", IEEE Multimedia, IEEE MultiMedia, October-December 2011, pp. 62-67, which is incorporated herein by reference in its entirety. It is appreciated however, that utilization of the DASH protocol may, in one variant, further require modification consistent with e.g., "*Guidelines for Implementation: DASH264 Interoperability Points*", DASH Industry Forum, Jan. 14, 2013, which is also incorporated herein by reference in its entirety. Alternative encapsulation protocol may also be utilized in conjunction with the present disclosure with equal success.

Additional processing of the received multicast content may include synchronization or clocking of the audio and video data. In one embodiment, this accomplished utilizing program clock reference (PCR) synchronization at a decoder of the gateway apparatus 202. The encoder/packager 208 (or other network entity) will include a PCR in the adaptation field of an MPEG-2 transport stream packet carrying the requested content. The PCR value is then employed to generate a system timing clock (STC) in the gateway 202 decoder, which is used to provide an accurate time base that is used to synchronize audio and video elementary streams.

Once the content is processed, it is provided to the requesting client 107 as a unicast stream from the gateway 202 (step 424). Various options are available for the transmission of the unicast content to the device 107, such as e.g., Transmission Control Protocol (TCP), Real Time Streaming Protocol (RTSP)/Real Time Transport Protocol (RTP), WebSocket, etc. In the instance the gateway 202 utilizes the aforementioned WebSocket technology, the client device 107 runs a HyperText Markup Language (HTML) 5 capable video player (which is compatible with WebSocket) to play the received content.

Managed Webserver—

Figure 5:
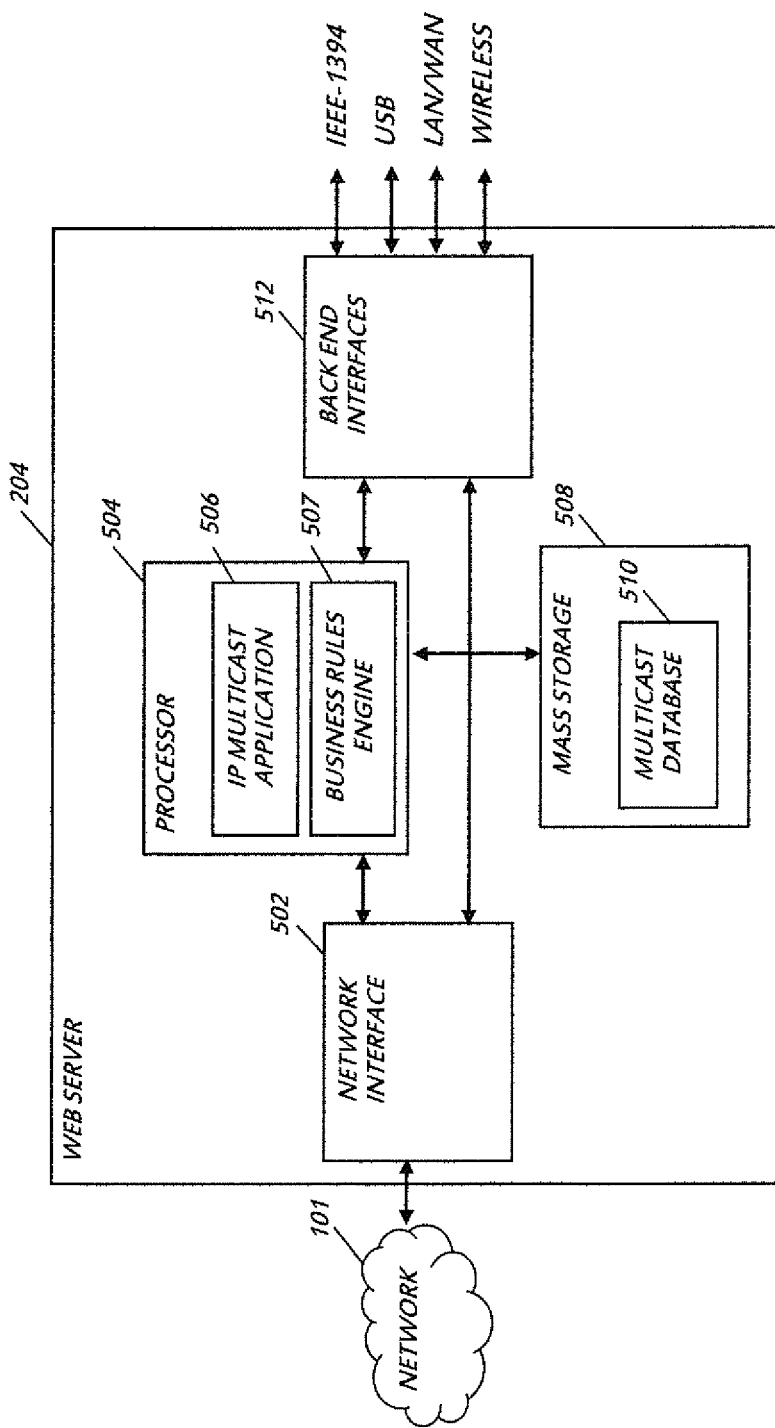
FIG. 5 is a functional block diagram illustrating one embodiment of a web server for use in delivering IP packetized content to a subscriber according to the present disclosure.

Referring now to FIG. 5, an exemplary embodiment of a webserver 204 is illustrated. As shown, the webserver 204 generally comprises a network interface 502 for communication with the content delivery network 101, and various back-end interfaces 512 for communication to other entities (not shown).

As discussed previously herein, the exemplary embodiment of the webserver 204 is configured to communicate via the aforementioned interface 502 with the gateway 202, the IP CPE 107 (via the gateway 202 in one embodiment), and the packager/encoder 208 (or other network 101 entity). In particular, the webserver 204 receives and responds to requests for content via the interface 502 (i.e., communication between the webserver 204 and gateway 202 or IP CPE 107) and the webserver 204 receives information relating to the content which is to be multicast from the packager/encoder 208 or other network 101 entity.

The instant webserver 204 further comprises a processor 504 and associated storage 508. As shown, the processor is configured to run at least an IP multicast application 506 and an operational/business rules engine 507.

The IP multicast application 506 enables the webserver 204 to process communications received from a client device 107 in order to determine whether requested content is provided via a multicast. The IP multicast application 506 examines the multicast database 510, which contains an updated list of content available for multicast delivery, to make the determination. As shown, the database 510 may be stored at the mass storage 508 of the webserver 204; alternatively the database may be located remote to yet in communication with the web server 204. The IP multicast application 506 is further configured to generate response messages to the requesting CPE 107 indicating a gateway URL, when requested content is available for a multicast. In the instance that the requested content is not available via a multicast, the IP multicast application 506 generates a response directing the device 107 (via a gateway 202 proxy in one embodiment) to the appropriate unicast server 206, or otherwise informing the client 107 (or gateway 202) that the content is available at the unicast server 206.

In addition, the IP multicast application 506 may be utilized to update the database 510 of multicast available content. In one embodiment, the application 506 receives updates from an entity of the CDN 101 including URL for various sources of multicast content. Other information may be provided from the network 101, such as e.g., a program identifier in addition to the URL. The application 506 uses the multicast information received from the network 101 to update entries in the database 510. For example, the multicast application 506 may determine whether a URL provided from the network as being available for multicast delivery is already listed in the multicast database 510. If the message indicates a URL already present in the database 510, the message is disregarded; if not, information in the message is used to add the URL to the database 510.

The operational/business rules engine 507 enables the webserver 204 to define rules for determining when to cause a content to be provided as a multicast. In one embodiment, the rules engine 507 clocks a number of times individual devices 107 request particular content (or sequences/collections of multiple content elements). When the number reaches a pre-determined threshold, the webserver 204 informs the CDN 101 that a multicast should be created, and the URL for the content may be added to the database 510. The various network 101 entities are then charged with causing the multicast to be instantiated (at e.g., the packager/encoder 208, MEM 162, etc.). The threshold may be based on a number of requests over a given period of time, and/or may be based on a service area within which the requests are received. Other mechanisms for determining popularity of requested content may be used as well.

In another embodiment, a recommendation engine such as e.g., that disclosed in co-owned, co-pending U.S. Patent Application Publication No. 2009/0193485 filed on Jan. 30, 2008, and entitled "METHODS AND APPARATUS FOR PREDICTIVE DELIVERY OF CONTENT OVER A NETWORK", which is incorporated herein by reference in its entirety, may be utilized in conjunction with the rules engine 507 to predict content for multicast delivery. As discussed therein, historical viewing or use information derived from the network is maintained and analyzed. In the previously referenced application, this information used to fill the bandwidth that is not currently being consumed via consumer requests with programming that is predictively selected. Applying those principles to the present disclosure, the information regarding historical viewing/use may be applied to identify content which is predicted to be in high demand. Such content may then be selected by the rules engine 507 to be provided as a multicast.

Gateway Device—

Figure 6:
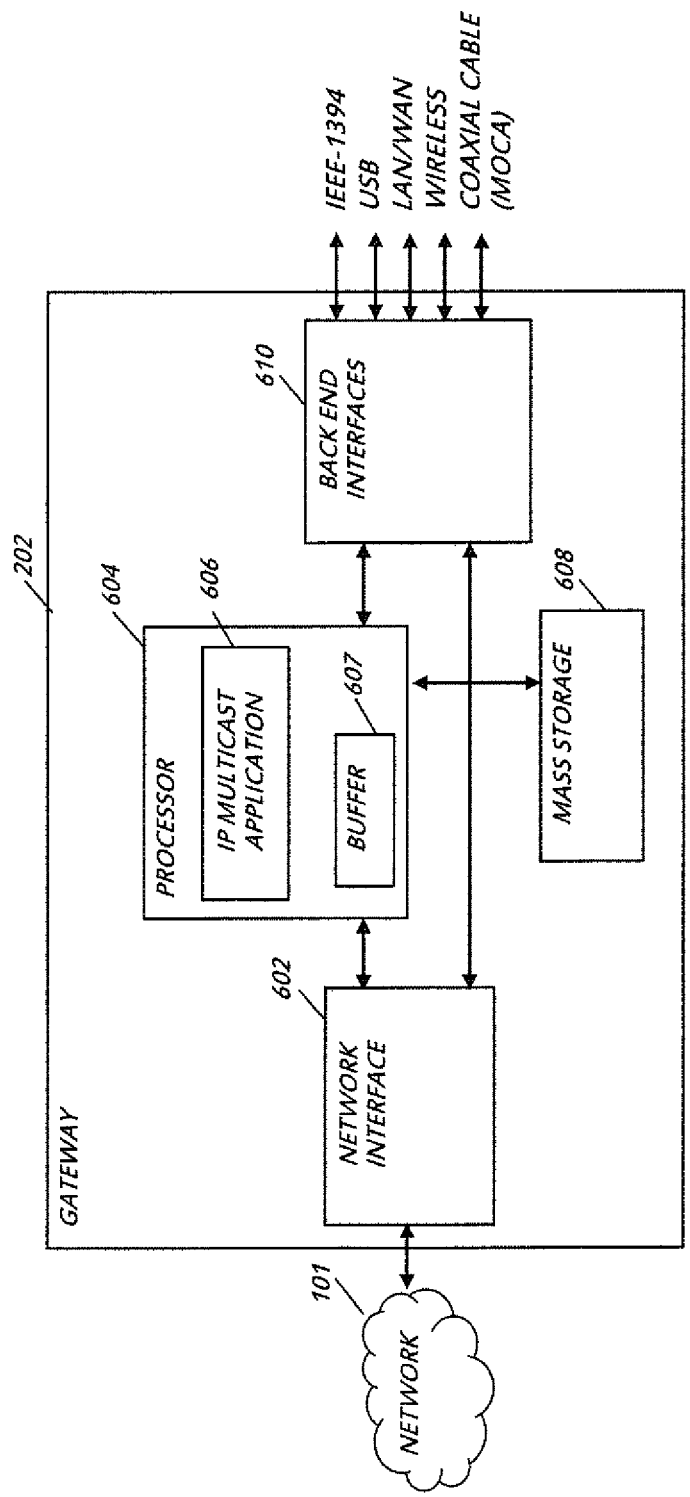
FIG. 6 is a functional block diagram illustrating one embodiment of a gateway device for use in delivering IP packetized content to a subscriber according to the present disclosure.

Referring now to FIG. 6, one exemplary embodiment of the gateway device 202 is illustrated. As shown, the gateway device 202 comprises a network interface 602, processor 604, mass storage 608, and backend interfaces 610.

The network interface 602 in one embodiment comprises a cable modem, such as e.g., a DOCSIS 3.0 compliant cable modem of the type discussed in "*DOCSIS® 3.0 Management Features Differences Technical Report*" CM-TR-MG-MTv3.0-DIFF-V01-071228 and "*DOCSIS 3.0 OSSI Configuration Management Technical Report*" CM-TR-OS-SIv3.0-CM-V01-080926, each of which is incorporated herein by reference in its entirety. The cable modem provides DOCSIS connectivity to the IP CPE 107 to be used for network communication (such as communication with the SDV server 196, the webserver 204, etc. as previously described), as well as various other purposes (such as VOD, Internet "surfing", interactive program guide (IPG) operation, etc.). In an alternative embodiment, the IP CPE 107 may communicate directly with the headend or other entities through the use of a headend proxy.

The network interface 602 of the gateway device 202 further comprises one or more QAM tuners configured to receive content from an HFC network 101. The RF tuner(s) may comprise traditional video RF tuner(s) adapted to receive video signals over, e.g., a QAM. For example, the RF tuner(s) may comprise one or more tuners, a demodulator, decryption module, and demultiplexer of the type well known in the art, although other configurations may be used. The number and type of QAM tuners utilized in the gateway device 202, as noted above, may be varied so as to ensure tuning across the entire available spectrum. Alternatively, different classes of devices may be provided each class having a different tuning range capability.

For example, the gateway 202 may include a wide band tuner, such as that discussed in previously referenced co-owned, co-pending U.S. Patent Application Publication No. 20060130113 entitled "METHOD AND APPARATUS FOR WIDEBAND DISTRIBUTION OF CONTENT" and filed Dec. 14, 2010. The wideband tuner arrangement enables the gateway 202 to receive content associated with one or more program streams distributed across two or more QAMs. Additionally, the RF tuner(s) may incorporate functionality to modulate, encrypt/multiplex as required, and transmit digital information for receipt by upstream entities such as the CMTS. The tuners may additionally be capable of tuning across the entire band of QAM channels such as those developed by e.g., Texas Instruments and Broadcom.

The gateway device 202 can assume literally any discrete form factor, including those adapted for settop/desktop, handheld, or wall-mounted use, or alternatively may be integrated in whole or part (e.g., on a common functional basis) with other devices (such as the IP CPE 107) if desired. Additionally, the gateway device 202 may include other elements and interfaces such as for example an interface for the HomePlug A/V standard which transmits digital data over power lines, WiFi capability, a PAN (e.g., 802.15), Bluetooth, or other short-range wireless interface for localized data communication, etc.

The gateway 202 processor 604 is configured to run an IP multicast application 606 thereon. The gateway application 606 enables the gateway 202 to receive requests for content. In one embodiment, the communication comprises a communication from the client devices 107 after having been redirected from the webserver 204; the communication in this instance may comprise an HTTP GET message for the requesting content. The gateway application 606 is further configured to assign a TCP port for the requested content. Alternatively, the message indicating that a TCP port for the requested content should be established may be received from the managed webserver 204 (once it is determined that the content is available via a multicast).

The gateway application 606 is further configured to provide to the client 107 the URL for the assigned port. A client response requesting to open the identified port is then received and processed at the application 606. The gateway application 606 is also configured to cause the gateway 202 to join a multicast for providing the requested content (such as e.g., via communication to an encoder/packager 208 and/or other network entity).

Once the multicast begins streaming, the gateway application 606 is further configured to cause the content to be processed. In one embodiment processing may include de-encapsulating the received internet content from a first media file container format and subsequently re-encapsulating the internet content to a second media file container format, transcription, translation, and/or transcoding. In one exemplary embodiment, content is converted from multicast to unicast via network address translation by the gateway application 606.

In addition, IP multicast application 606 may further enable processing to modify the HTTP Live Streaming (HLS) protocol to support persistent stream of non-adaptive video and/or to encapsulate content using modified FMEPG 4 or DASH encapsulation (such that multicast chunks fit into a single multicast packet) as discussed above.

Still further, the IP multicast application 606 may be utilized to manage buffer timing of the gateway buffer 203. In other words, the application 606 may implement one or more rules for enabling or disabling trick mode functionalities requested by the device 107 with respect to content. The application 606 therefore controls the buffer 203.

Communication between the gateway 202 and the client devices 106 and 107 occurs via the backend interfaces 610. As noted previously, such communication may utilize e.g., IEEE 1394, USB, LAN/WAN, wireless, and/or MOCA communications protocol with equal success.

Various options may be utilized to protect content as it is transmitted to the gateway device 202 and on to the IP CPE 107. In one embodiment, the encoder/packager 208 is configured to rotate a common key for a multicast. Signals transmitted to the gateway 202 which include key updates are flagged (such as by a TS header). Receipt of these flags at the gateway 202, triggers the gateway 202 to pull the corresponding key from the key server via an authenticated Hypertext Transfer Protocol Secure (HTTPS). The gateway 202 can then transcript content from multicast to unicast (as discussed above) via the key. In addition, the gateway 202 may store client/session specific keys for use during playback.

In another variant, the gateway 204 can be configured to use one tuner and associated digital processing chain to receive and encapsulate a first stream destined for one multicast address (and associated IP CPE 107), while using a second tuner to receive an already IP-encapsulated stream, such as via a normal DOCSIS QAM or the like. Hence, the gateway can act as a hybrid "switched" IPTV/non-switched IP device for multiple CPE in the premises.

Referring back to FIG. 6, the gateway apparatus 202 further comprises a trick mode buffer 607. The trick mode buffer 607 enables a viewer at the client device 107 to stop, pause, rewind, play, fast-forward, etc. streamed IP content. In one embodiment, this is accomplished by caching a portion of a content stream at the buffer 607 (or storage entity associated therewith). When a trick mode is requested by a viewer (such as via a button press at a remote control apparatus associated with the client device 107 or a display device in communication therewith), the IP gateway application 606 determines whether the requested function is available for the particular content by the particular device. It is appreciated that various business rules may be implemented by the gateway 202 to ensure that only devices which have established with the network 101 a right to access trick mode functionality are given access thereto. For example, certain subscribers may purchase rights to a service level that includes the ability to perform trick mode operations. The foregoing business rules may alternatively or in addition be implemented by the gateway 202 to ensure that only content which is designated as being available for trick mode operations is provided with trick mode capabilities. In other words, certain content sources may designate their content as unavailable for trick mode operation; accordingly, the gateway application 606 will cause the buffer 607 to not buffer the content thus disabling trick mode features.

Exemplary User Device—

Figure 7:
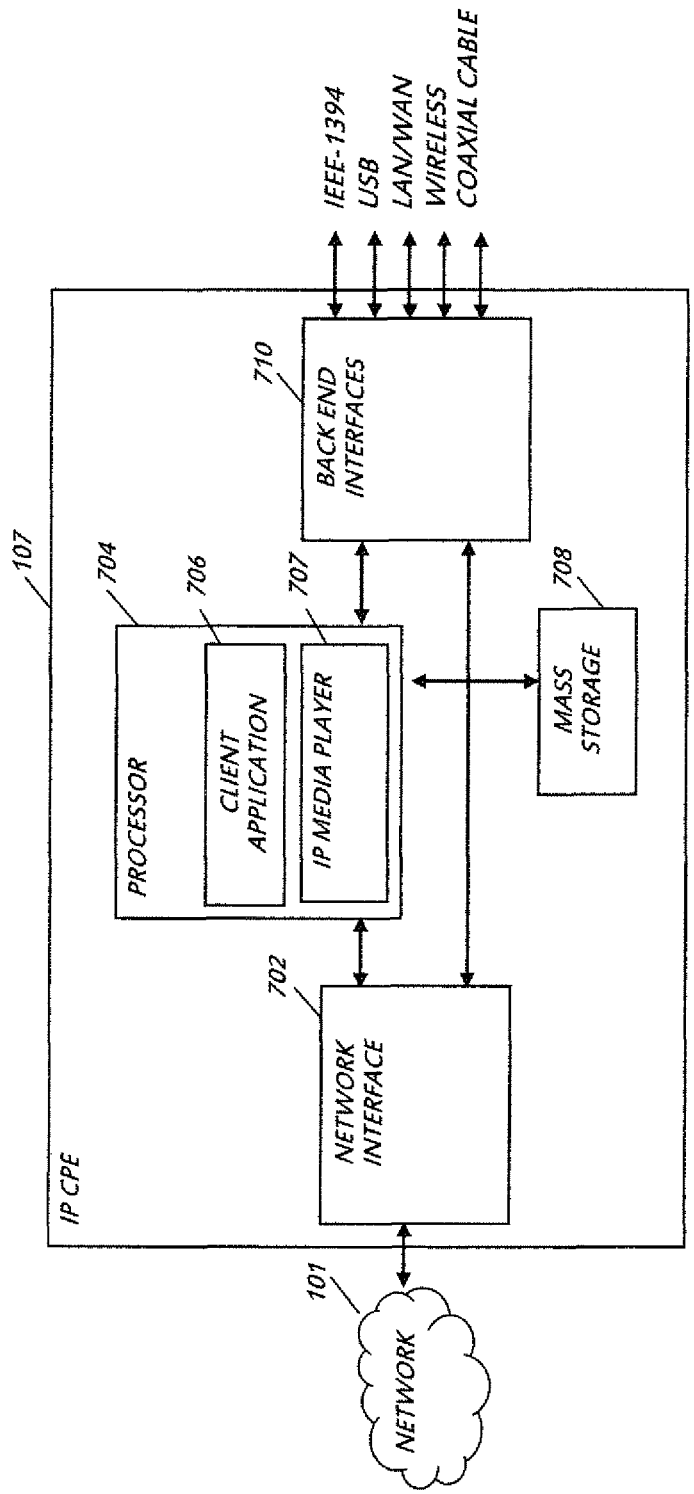
FIG. 7 is a functional block diagram illustrating an exemplary embodiment of an IP enabled CPE according to the present disclosure.

An exemplary IP capable user device (or CPE) 107 useful with the present disclosure is illustrated in FIG. 7. The IP-capable CPE 107 may comprise any device capable of receiving and decoding IP packetized content, whether for display thereon, or for recording, display, or storage on a device in communication therewith. Exemplary devices include IP-enabled settop boxes, IP-enabled television sets, laptop and desktop computers, and even cellular smartphones, personal media devices (PMD), etc. In one exemplary embodiment, the IP-capable CPE 107 is compatible with Digital Living Network Alliance (DLNA) standards for consumer electronics (such as those discussed in DLNA Interoperability Guidelines, version 1.5, published March 2006 (expanded October 2006), which is incorporated herein by reference in its entirety) for signaling purposes, and also makes use of a digital rights management (DRM) content protection scheme to comply with limitations on certain content, or provide authorization credentials with respect to protected content.

As shown in FIG. 7, the IP CPE 107 generally includes e.g., a network interface 702, a processor 704 and associated storage 708, and optionally a plurality of back end interfaces 710 for communication with other devices.

The network interface 702 enables communication between the IP CPE 107 and the network 101 (and/or gateway 202, managed webserver 204, etc. as applicable). One or more of the backend interfaces 710 are used for communication with other linked devices. In one embodiment, the backend interface 710 (and not the network interface 702) is used for communication between the IP CPE 107 and the gateway 204. Since the content being passed between the two devices is IP encapsulated, and only relatively low overhead communications between the IP CPE 107 and the gateway 204 are needed to support the functionality described herein, the interface between the two devices can literally assume any form, including wired and wireless.

The IP CPE 107 processor 704 is configured to load and run a media player 707, such as an HTML5 video player, in order to play the received content. The media player 707 in one embodiment is compatible with the aforementioned WebSocket protocol. DRM and/or Conditional Access (CA) functionalities may also be implemented and supported at the media player 707.

In one embodiment, restrictions (if any) to the provision of content to a user at a display or rendering device associated with the user device are determined by the device (e.g., IP CPE 107, etc.) itself, as discussed in co-owned, co-pending U.S. Patent Application Publication No. 2011/0219229 filed on Mar. 2, 2010 and entitled "APPARATUS AND METHODS FOR RIGHTS-MANAGED CONTENT AND DATA DELIVERY", which is incorporated herein by reference in its entirety. As discussed therein, a downloadable or transferable rights profile coupled with a "smart" media player application are given. The rights profile contains information regarding the specific rights of a device and/or a subscriber to access content. It is via the rights profile that the device (via the media player and its associated rights management application) determines whether to provide content to a subscriber, and/or what restrictions or privileges to apply. Hence, in the present context, the MSO might generate a rights profile and pass this profile (or information indicating which of a plurality of pre-positioned profiles to apply) to the gateway device 202 for transmission to the smart media player 707 on the client device 107.

The processor 704 also runs an IP client application 706 for requesting and receiving IP multicast content. The IP client application 706 generates the messages necessary for the aforementioned handshake process needed to establish a persistent stream of non-adaptive video. In addition, the IP client application 706 enables the IP client 107 to request and receive IP unicast content (such as directly from a unicast server 206 or via the gateway 202).

In yet another embodiment, the IP CPE 107 further comprises a hard drive in communication therewith or integrated therein which acts as a digital video recorder (not shown).

Channel Change Delays—

It is often the instance that, upon completion of a first requested content element, a viewer will change the channel to other desired content. However, when the requested content is IP content, the user may experience a significant delay in a period of time needed to tear down delivery of the first requested content, and provide delivery of second requested content (whether via a multicast or unicast).

Accordingly, in one embodiment of the disclosure, IP content delivery mechanisms may be further enhanced to reduce switching delays. In one variant, the methods and apparatus disclosed in co-owned, co-pending U.S. patent application Ser. No. 13/213,817 filed on Aug. 19, 2011 and entitled "APPARATUS AND METHODS FOR REDUCED SWITCHING DELAYS IN A CONTENT DISTRIBUTION NETWORK", which is incorporated herein by reference in its entirety, may be utilized. As discussed therein, the channel switching delays are in exemplary embodiments reduced by caching "background" content (i.e., content which it is anticipated the viewer will request next) at reduced quality and/or resolution. In the instance the content to be cached is provided via a multicast, the cache may occur at the gateway 202 prior to an actual request from the CPE 107. The foregoing methods for causing the gateway to establish a secure port and join a multicast (discussed at e.g., FIGS. 3 and 4 above) are not implemented until an actual request for the cached content is received. If the content to be cached is provided as a unicast from a unicast server, it may be cached at either the gateway 202 or the client device 107. The provided background content anticipates channel changes and, when a channel change is made to the background content, the selected content is immediately increased in quality and/or resolution, and provided to the requesting device along with updated background content. The increase in quality and/or resolution may occur via a switch from providing the pre-cached low-quality content to the multicast or unicast stream.

In one exemplary implementation, the network includes a manager entity which manages which and how many background channels are cached. The provision of background content may be based on any number of different parameters or considerations, such as for example the user or device behavior and patterns, user preferences or "favorites", bandwidth considerations, time of day, and/or subscription level. Information or metadata enabling the manager entity to make such determinations is stored at a database accessible by the entity.

Many other approaches and combinations of various operational and business paradigms are envisaged consistent with the present disclosure, as will be recognized by those of ordinary skill when provided this disclosure.

It will be recognized that while certain aspects of the present disclosure are described in terms of a specific sequence of steps of a method, these descriptions are only illustrative of the broader methods, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the present disclosure and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the ideas set forth herein. The foregoing description is of the best mode presently contemplated of carrying out the invention. This description is in no way meant to be limiting, but rather should be taken as illustrative of the general principles of. The scope of the invention should be determined with reference to the claims.

What is claimed is:

1. A method for providing Internet Protocol (IP) packetized content to a client device, said method comprising:
   receiving at a gateway apparatus a request for access to said IP packetized content from a client device, said request comprising a request for access to a document object associated to said IP packetized content;
   assigning a transmission control protocol (TCP) port for a persistent socket connection to provide said requested IP packetized content;
   providing to said client device, in response to said request, a uniform resource locator (URL) for said persistent socket connection;
   receiving a request to enable said TCP port and access said requested IP packetized content from said client device;
   in response to receiving said request, said gateway apparatus joining a multicast for providing said requested IP packetized content;
   processing said requested IP packetized content received via said multicast; and
   providing said requested IP packetized content to said client device as a unicast thereto.

2. The method of claim 1, wherein said act of processing comprises converting said content from a multicast format to a unicast format.

3. The method of claim 1, further comprising storing at least a portion of said received IP packetized content in a local cache associated to said gateway apparatus.

4. The method of claim 3, further comprising using said stored at least portion of said IP packetized content to enable a viewer at said client device to perform one or more trick mode operations with respect to said IP packetized content.

5. The method of claim 1, wherein said persistent socket connection comprises a WebSocket connection and said client device is configured to run a media player compatible with said WebSocket connection.

6. The method of claim 5, wherein said media player is further configured to determine one or more rights of said client device and/or a user thereof to said IP packetized content.

7. An apparatus configured to provide Internet Protocol (IP) packetized content to a client device, said apparatus comprising:
   at least one interface configured to receive a multicast comprising said IP packetized content via a persistent socket connection;
   at least one interface configured to provide a unicast comprising said IP packetized content to said client device; and
   at least one processor configured to execute at least one computer program thereon, said computer program comprising a plurality of instructions which are configured to, when executed:
      receive a request for access to said IP packetized content from said client device, said request comprising a uniform resource locator (URL) provided from a managed webserver;
      receive a request to enable a TCP port assigned to deliver said requested IP packetized content via said persistent socket connection; and
      join a multicast configured to provide said requested IP packetized content.

8. The apparatus of claim 7, wherein said plurality of instructions are further configured to, when executed, exit said multicast upon completion of delivery of said requested IP packetized content.

9. The apparatus of claim 7, wherein said plurality of instructions are further configured to, when execute, process a received multicast comprising said IP packetized content.

10. The apparatus of claim 9, wherein said multicast is processed via network address translation to modify IP address information in IP packet headers of said IP packetized content to reference a unicast delivery address.

11. The apparatus of claim 9, wherein said plurality of instructions are further configured to, when executed:
   select one or more second IP packetized content based at least in part on a determination of future interest in said one or more second IP packetized content;
   cause at least a portion of said one or more second IP packetized content to be stored at a storage entity in communication with said apparatus; and
   upon request therefor, deliver said stored one or more second IP packetized content.

12. The apparatus of claim 11, wherein said plurality of instructions are further configured to, when executed, simultaneous to said delivery, join a multicast of said one or more second IP packetized content upon said user request therefor.

13. Computer readable apparatus comprising media configured to contain a computer program having a plurality of instructions, said plurality of instructions configured to, when executed:
- receive a first request for access to IP packetized content from a client device, said request comprising a request for access to a document object associated to said IP packetized content;
- assign a transmission control protocol (TCP) port for a persistent socket connection to provide said requested IP packetized content;
- provide to said client device, in response to said request, a uniform resource locator (URL) for said persistent socket connection;
- receive a second request to enable said TCP port and access said requested IP packetized content from said client device;
- in response to said receipt of said second request, join a multicast configured to provide said requested IP packetized content;
- process said requested IP packetized content received via said multicast; and
- provide said requested IP packetized content to said client device as a unicast thereto.

14. The computer readable apparatus of claim 13, wherein said plurality of instructions are further configured to, when executed, convert said content from a multicast format to a unicast format.

15. The computer readable apparatus of claim 13, wherein said plurality of instructions are further configured to, when executed, store at least a portion of said received IP packetized content in a local cache.

16. The computer readable apparatus of claim 15, wherein said plurality of instructions are further configured to, when executed, use said stored at least portion of said IP packetized content to enable a viewer at said client device to perform one or more trick mode operations with respect to said IP packetized content.

17. The computer readable apparatus of claim 13, wherein said persistent socket connection comprises a WebSocket connection and said client device is configured to run a media player compatible with said WebSocket connection.

18. The computer readable apparatus of claim 17, wherein said media player is further configured to determine one or more rights of said client device and/or a user thereof to said IP packetized content.

19. A method for providing Internet Protocol (IP) packetized content to a client device, said method comprising:
- receiving a multicast comprising said IP packetized content via a persistent socket connection;
- receiving a first request for access to said IP packetized content from said client device, said request comprising a uniform resource locator (URL) provided from a managed webserver;
- receiving a second request to enable a TCP port assigned to deliver said requested IP packetized content via said persistent socket connection; and
- joining a multicast configured to provide said requested IP packetized content.

20. The method of claim 19, further comprising exiting said multicast upon completion of delivery of said requested IP packetized content.

* * * * *